US007569277B2

(12) United States Patent
Nakashima et al.

(10) Patent No.: US 7,569,277 B2

(45) Date of Patent: Aug. 4, 2009

(54) OPTICAL LAMINATE

(75) Inventors: Masataka Nakashima, Tokyo-To (JP); Takeshi Hirai, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 16 days.

(21) Appl. No.: 11/223,901

(22) Filed: Sep. 9, 2005

(65) Prior Publication Data

US 2006/0152713 A1 Jul. 13, 2006

(30) Foreign Application Priority Data

Sep. 30, 2004 (JP) ............................. 2004-286485
Oct. 29, 2004 (JP) ............................. 2004-316756

(51) Int. Cl.
*B32B 15/00* (2006.01)

(52) U.S. Cl. ....................... 428/426; 428/430; 428/435; 428/412

(58) Field of Classification Search ....................... None
See application file for complete search history.

(56) References Cited

U.S. PATENT DOCUMENTS

2003/0156080 A1 * 8/2003 Koike et al. .................. 345/60
2004/0232813 A1 11/2004 Nakano et al.

FOREIGN PATENT DOCUMENTS

| | | |
|---|---|---|
| JP | 10-026704 | 1/1998 |
| JP | 2001-233611 | 8/2001 |
| JP | 2002-080503 | 3/2002 |
| JP | 2003-167118 | 6/2003 |

* cited by examiner

*Primary Examiner*—Timothy M Speer
(74) *Attorney, Agent, or Firm*—Burr & Brown

(57) ABSTRACT

The present invention disclosed an optical laminate that can realize excellent contrast and image visibility. The optical laminate comprises: a light transparent base material; and an antistatic agent-containing hardcoat layer and a lower-refractive index layer provided in that order on the light transparent base material, wherein the optical laminate has a black luminance of not more than 9.3 cd/$m^2$, and the optical laminate has a total light transmittance of not less than 80% and not more than 94%.

10 Claims, 1 Drawing Sheet

OPTICAL LAMINATE

CROSS-REFERENCE TO RELATED APPLICATIONS

This application is a patent application claiming priority based on Japanese Patent Application Nos. 286485/2004 and 316756/2004, the whole of which is incorporated herein.

TECHNICAL FIELD

The present invention relates to an optical laminate having improved image visibility and contrast.

BACKGROUND OF THE INVENTION

In image display apparatuses using a fluorescent substance, for example, cathode-ray tube display devices (CRTs), plasma displays (PDPs), vacuum fluorescent displays, and field emission-type displays, for example, an electron beam or ultraviolet light is applied to the fluorescent substance to cause fluorescent emission of the fluorescent substance, and an image is displayed by taking advantage of transmitted light or reflected light from the fluorescent screen.

For image display devices using a fluorescent substance, it has been often pointed out that, due to high reflectance of the fluorescent substance, reflection of external light from the surface of the display device occurs resulting in lowered visibility of displayed images. In order to prevent the external light reflection and thus to improve the visibility, an optical laminate formed of an anti-dazzling laminate or an antireflective laminate has hitherto been used on the surface of the image display apparatus.

However, it has been often pointed out that, since the fluorescent substance in the image display device is white, the reflectance is so high that external light-derived reflected light is likely to occur and, further, reflected light often occurs as scattered light within the optical laminate and the fluorescent substance in the image display device and, as a result, these reflected light and scattered light affect luminescent color from the fluorescent substance, making it impossible to provide images possessing excellent contrast (particularly black reproduction) and light transmission.

In order to suppress this phenomenon, Japanese Patent Laid-Open No. 26704/1998 proposes an optical laminate comprising a colored material (layer) provided between the surface of a display device and an antireflective laminate. Since, however, the colored material (layer) per se has low transmittance, the total light transmittance is disadvantageously lowered to about 50 to 70% and, consequently, image reproduction is often lowered. Further, Japanese Patent Laid-Open No. 167118/2003 proposes a structure comprising a filter for an electronic display device, coated with a chemical substance having very small transmittance to a specific wavelength without providing any colored material (layer) or any pressure-sensitive adhesive layer.

However, urgent development of an optical laminate which can effectively prevent external light reflection, has a high level of total light transmittance, and, at the same time, can realize images having excellent contrast are still demanded.

SUMMARY OF THE INVENTION

At the time of the present invention, the present inventors have found that excellent contrast and image visibility can be realized by bringing the black luminance and total light transmittance of an optical laminate to respective specific numerical ranges. Accordingly, an object of the present invention is to provide an optical laminate, which has excellent antireflection function and improved image display properties, by focusing attention to the luminance and total light transmittance in an optical laminate and bringing the luminance value and the total light transmittance to respective specific ranges.

According to a first aspect of the present invention, there is provided an optical laminate comprising: a light transparent base material; and an antistatic agent-containing hardcoat layer provided on said light transparent base material, wherein said optical laminate has a black luminance of not more than 9.3 cd/m$^2$, and said optical laminate has a total light transmittance of not less than 80% and not more than 94%.

According to a second aspect of the present invention, there is provided an optical laminate comprising: a light transparent base material; and an antistatic layer and a hardcoat layer (or a hardcoat layer and an antistatic layer) provided in that order on said light transparent base material, wherein said optical laminate has a total light transmittance of not less than 80% and not more than 94%, and said optical laminate has a black luminance of not more than 9.3 cd/m$^2$.

According to another aspect of the present invention, there is provided an apparatus for evaluating an optical laminate, said apparatus comprising:

a first optical measuring instrument for measuring the total light transmittance of said optical laminate;

a light source arranged so that reflected light upon irradiating the surface of the optical laminate reaches in front of a second optical measuring instrument;

an image display device having an image output surface to which said optical laminate is attached;

a second optical measuring instrument for measuring the black luminance of said optical laminate attached to the image output surface of said image display device; and a detector for evaluating said optical laminate wherein the black luminance and the total light transmittance are not more than 9.3 cd/m$^2$ and not less than 80% and not more than 94%, respectively.

According to a further aspect of the present invention, there is provided a method for evaluating an optical laminate, said method comprising:

measuring the total light transmittance of said optical laminate;

attaching said optical laminate to the image output surface of an image display device, measuring the black luminance of said optical laminate from reflected light upon irradiating the surface of said optical laminate from a light source; and evaluating the optical laminate wherein the black luminance of said optical laminate and the total light transmittance are not more than 9.3 cd/m$^2$ and not less than 80% and not more than 94%, respectively.

DETAILED DESCRIPTION OF THE INVENTION

1. Optical Laminate

1) Properties

Luminance

Figure 1:
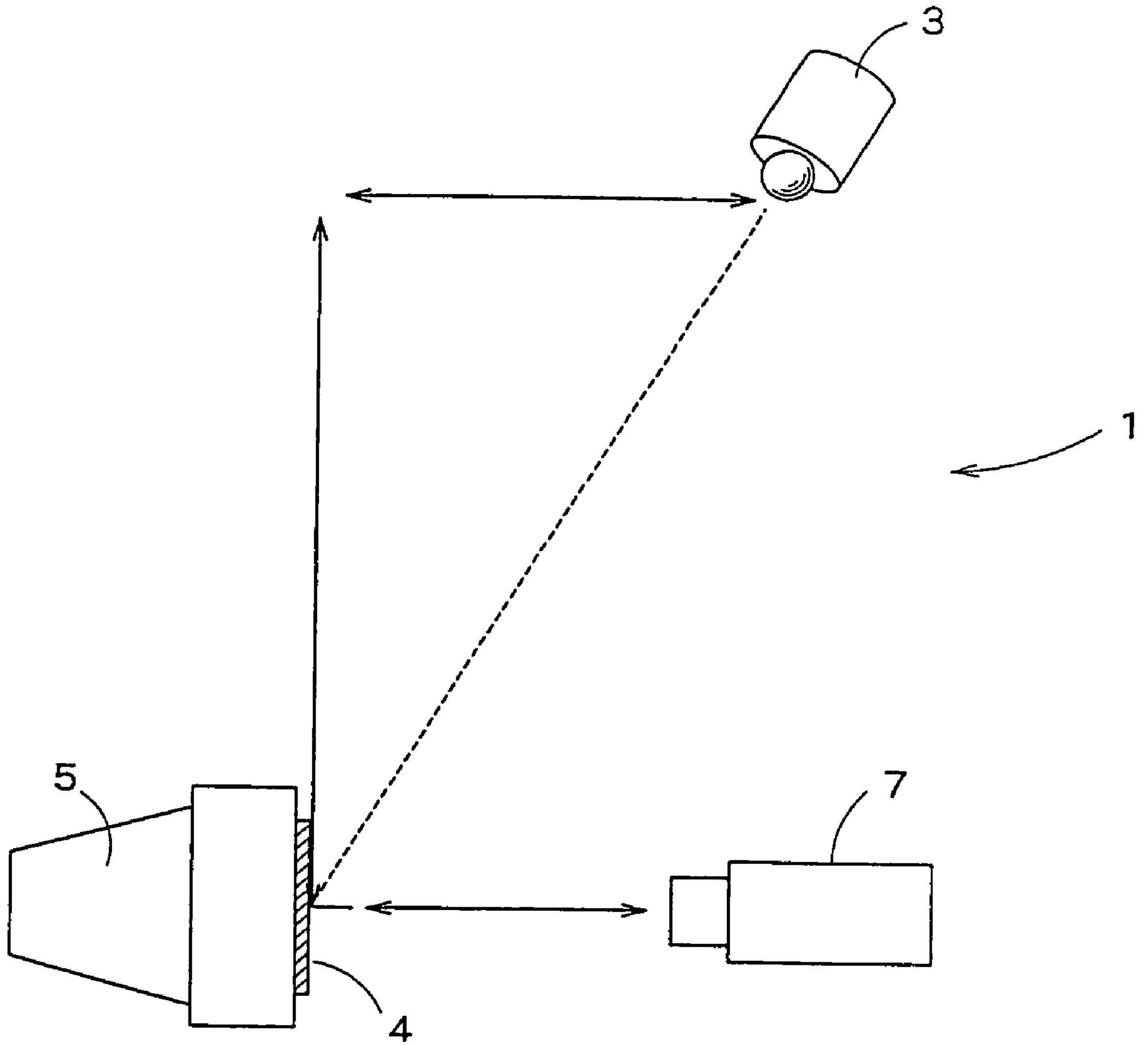
FIG. 1 is a schematic diagram of an apparatus for evaluating an optical laminate according to the present invention.

The optical laminate according to the present invention is evaluated in terms of luminance, preferably black luminance. In the present invention, the black luminance of the optical laminate may be measured by attaching an optical laminate to a surface on which black is displayed (9.13 cd/$m^2$) and measuring the luminance with an optical measuring instrument (a luminance meter) provided at a position distant by 500 mm from the optical laminate. Image output face of image display devices such as cathode-ray tube display devices (CRTs), plasma displays (PDPs), vacuum fluorescent displays, and field emission-type displays can be utilized for black display.

Total Light Transmittance

The optical laminate according to the present invention has a total light transmittance of not less than 80%, preferably not less than 89% and not more than 94%. The total light transmittance may be measured with a haze meter HR100 (tradename; manufactured by Murakami Color Research Laboratory) according to JIS K 7105.

Reflectance

In the present invention, an optical laminate having a five-degree reflectance of not more than 4.5%, preferably not more than 3%, more preferably not more than 2%, is preferred. Here the term "five-degree reflectance (Y value)" refers to a Y value determined in such a manner that the five-degree regular reflectance in a wavelength range of 400 to 700 nm is measured with an optical measuring instrument (a spectrometer) and the measured value is subjected to luminosity correction according to JIS Z 8701. The optical measuring instrument may be a commercially available product, and an example thereof is UV-3100PC, manufactured by Shimadzu Seisakusho Ltd.

Haze Value

In a preferred embodiment of the present invention, the optical laminate has a haze value of not more than 3%, preferably not more than 1%. The haze value may be measured by using the same measuring method and measuring apparatus as used in the measurement of the total light transmittance.

2) First Aspect of Invention

According to a first aspect of the present invention, there is provided an optical laminate, and the construction of the optical laminate is as follows.

Light Transparent Base Material

The light transparent base material is preferably transparent, smooth and resistant to heat and possesses excellent mechanical strength. Specific examples of materials for light transparent base material formation include thermoplastic resins such as polyester, cellulose triacetate, cellulose diacetate, cellulose acetate butyrate, polyester, polyamide, polyimide, polyether sulfone, polysulfone, polypropylene, polymethylpentene, polyvinyl chloride, polyvinyl acetal, polyether ketone, polymethyl methacrylate, polycarbonates, or polyurethane. Preferred are polyesters and cellulose triacetate.

The thickness of the light transparent base material is not less than 20 μm and not more than 300 μm. Preferably, the upper limit of the thickness of the light transparent base material is 200 μm, and the lower limit of the thickness is 30 μm. When the light transparent base material is in a plate form, the thickness of the plate may exceed this thickness. Further, when a layer having optical properties is formed on the light transparent base material, from the viewpoint of improving the adhesion, the light transparent base material may be previously subjected to physical treatment such as corona discharge treatment or oxidation treatment or subjected to coating with a coating material called an anchor agent or a primer.

Hardcoat Layer

The hardcoat layer according to the present invention comprises a resin and an antistatic agent. The hardcoat layer according to the present invention is formed so as to have an antistatic function. The term "hardcoat layer" refers to a layer having a hardness of "H" or higher as measured by a pencil hardness test specified in JIS 5600-5-4 (1999). The thickness of the hardcoat layer (on a cured state basis) is not less than 3 μm and not more than 10 μm. Preferably, the lower limit of the thickness is 4 μm, and the upper limit of the thickness is 8 μm.

Antistatic Agent (Electrically Conductive Agent)

Specific examples of antistatic agents usable herein include quaternary ammonium salts, pyridinium salts, various cationic compounds containing cationic groups such as primary to tertiary amino groups, anionic compounds containing anionic groups such as sulfonic acid bases, sulfuric ester bases, phosphoric ester bases, and phosphonic acid bases, amphoteric compounds such as amino acid and aminosulfuric acid ester compounds, nonionic compounds such as amino alcohol, glycerin, and polyethylene glycol compounds, organometal compounds such as alkoxides of tin and titanium, and metal chelate compounds such as their acetyl acetonate salts. Further, compounds prepared by increasing the molecular weight of the above exemplified compounds may also be mentioned. Furthermore, monomers or oligomers, which contain a tertiary amino group, a quaternary ammonium group, or a metal chelate part and is polymerizable by an ionizing radiation, or polymerizable compounds, for example, organometal compounds such as coupling agents containing a functional group(s) may also be used as the antistatic agent.

Electrically conductive ultrafine particles may also be mentioned. Specific examples of electrically conductive fine particles include fine particles of metal oxides. Such metal oxides include ZnO (refractive index 1.90; numerical value within the parentheses referred to hereinbelow being a refractive index value), $CeO_2$ (1.95), $Sb_2O_2$ (1.71), $SnO_2$ (1.997), indium tin oxide often abbreviated to ITO (1.95), $In_2O_3$ (2.00), $Al_2O_3$ (1.63), antimony doped tin oxide (abbreviation; ATO, 2.0), and aluminum doped zinc oxide (abbreviation; AZO, 2.0). Fine particles refer to particles having a size of not more than 1 micron, that is, the so-called submicron size, preferably having an average particle diameter of 0.1 nm to 0.1 μm.

In a preferred embodiment of the present invention, when the thickness of the hardcoat layer is in the above-defined range, the weight ratio of the addition amount of the antistatic agent to the amount of the resin in the hardcoat layer, that is, PV ratio (PV ratio=weight of antistatic agent/weight of resin), is not less than 5 and not more than 25. Preferably, the upper limit of the PV ratio is 20, and the lower limit of the PV ratio is 5. The black luminance and the total light transmittance can be advantageously regulated to the respective numerical ranges specified in the present invention by regulating the addition amount to the above-defined numerical range.

Resin

The resin is preferably transparent, and specific examples thereof include three types of resins curable upon exposure to ultraviolet light or electron beams, that is, ionizing radiation curing resins, mixtures of ionizing radiation curing resins and solvent drying-type resins, and heat curing resins. Preferred are ionizing radiation curing resins.

Specific examples of ionizing radiation curing resins include acrylate functional group-containing resins, for example, relatively low-molecular weight polyester resins, polyether resins, acrylic resins, epoxy resins, urethane resins, alkyd resins, spiroacetal resins, polybutadiene resins, polythiolpolyene resins, oligomers or prepolymers of (meth)acrylates or the like of polyfunctional compounds such as polyhydric alcohols, and reactive diluents. Specific examples thereof include monofunctional monomers and polyfunctional monomers such as ethyl (meth)acrylate, ethylhexyl (meth)acrylate, styrene, methylstyrene, N-vinylpyrrolidone, for example, polymethylolpropane tri(meth)acrylate, hexanediol (meth)acrylate, tripropylene glycol di(meth)acrylate, diethylene glycol di(meth)acrylate, pentaerithritol tri(meth) acrylate, dipentaerithritol hexa(meth)acrylate, 1,6-hexanediol di(meth)acrylate, and neopentyl glycol di(meth)acrylate.

When the ionizing radiation curing resin is an ultraviolet curing resin, the use of a photopolymerization initiator is preferred. Specific examples of photopolymerization initiators include acetophenones, benzophenones, Michler's benzoyl benzoate, α-amyloxime ester, and thioxanthones. Further, a photosensitizer is preferably mixed in the resin, and specific examples thereof include n-butylamine, triethylamine, and poly-n-butylphosphine. Further, 1-hydroxy-cyclohexyl-phenyl-ketone may be mentioned. This compound is commercially available, and an example thereof is Irgacure184 (tradename: manufactured by Ciba Specialty Chemicals, K.K.).

When the ionizing radiation curing resin is an ultraviolet curing resin, a photopolymerization initiator or a photopolymerization accelerator may be added. In the case of a radically polymerizable unsaturated group-containing resin system, for example, acetophenones, benzophenones, thioxanthones, benzoins, and benzoin methyl ether may be used as the photopolymerization initiator either solely or as a mixture of two or more. On the other hand, in the case of a cationically polymerizable functional group-containing resin system, for example, aromatic diazonium salts, aromatic sulfonium salts, aromatic iodonium salts, metallocene compounds, and benzoin sulfonate may be used as the photopolymerization initiator either solely or as a mixture of two or more. The amount of the photopolymerization initiator added is 0.1 to 10 parts by weight based on 100 parts by weight of the ionizing radiation curing composition.

The solvent drying-type resin mixed into the ionizing radiation curing resin is mainly a thermoplastic resin. Generally exemplified thermoplastic resins may be used. The occurrence of coating film defects in the coating surface can be effectively prevented by adding the solvent drying-type resin. In a preferred embodiment of the present invention, when the material for the transparent base material is a cellulosic resin such as TAC, specific examples of preferred thermoplastic resins include cellulosic resins, for example, nitrocellulose resins, acetyl cellulose resins, cellulose acetate propionate resins, and ethylhydroxyethylcellulose resins.

Specific examples of heat curing resins include phenolic resins, urea resins, diallyl phthalate resins, melanin resins, guanamine resins, unsaturated polyester resins, polyurethane resins, epoxy resins, aminoalkyd resins, melamine-urea co-condensation resins, silicone resins, and polysiloxane resins. When heat curing resins are used, if necessary, curing agents such as crosslinking agents and polymerization initiators, polymerization accelerators, solvents, viscosity modifiers and the like may also be added.

Optional Components

Anti-dazzling Agent

The hardcoat layer may comprise an anti-dazzling agent. Fine particles may be mentioned as the anti-dazzling agent and may be in the form of sphere, ellipse and the like, preferably sphere. The fine particles may be either inorganic or organic type. Preferably, however, the fine particles are formed of an organic material. The fine particles exhibit anti-dazzling properties and are preferably transparent. Specific examples of fine particles include plastic beads, more preferably transparent plastic beads. Specific examples of plastic beads include styrene beads (refractive index 1.59), melamine beads (refractive index 1.57), acrylic beads (refractive index 1.49), acrylic-styrene beads (refractive index 1.54), polycarbonate beads, polyethylene beads and the like. The amount of the fine particles added is 2 to 30 parts by weight, preferably about 10 to 25 parts by weight, based on 100 parts by weight of the transparent resin composition.

Solvents

In forming the hardcoat layer, a composition for an antistatic layer which is a mixture of the above components with a solvent is utilized. Specific examples of solvents include: alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixtures thereof. Preferred are ketones and esters.

Formation of Hardcoat Layer

The hardcoat layer may be formed by mixing the above-described resin, solvent and optional components together to prepare a composition which is then coated onto a light transparent base material. In a preferred embodiment of the present invention, a leveling agent such as a fluoro or silicone leveling agent is added to the liquid composition. The liquid composition with a leveling agent added thereto can realize a good coating face and can effectively prevent the inhibition of curing by oxygen on the coating film surface at the time of coating or drying and can advantageously impart scratch resistance.

The composition may be coated by a coating method such as roll coating, Mayer bar coating, or gravure coating. After coating of the liquid composition, drying and ultraviolet curing are carried out. Specific examples of ultraviolet light sources include ultrahigh pressure mercury lamps, high pressure mercury lamps, low pressure mercury lamps, carbon arc lamps, black light fluorescent lamps, and metal halide lamps. A wavelength region of 190 to 380 nm may be used as wavelengths of the ultraviolet light. Specific examples of electron beam sources include various electron beam accelerators, such as Cockcroft-Walton accelerators, van de Graaff accelerators, resonance transformers, insulated core transformers, linear, dynamitron, and high-frequency electron accelerators.

Lower-Refractive Index Layer

In a preferred embodiment of the present invention, a lower-refractive index layer is provided on the hardcoat layer. The lower-refractive index layer may be formed of a thin film comprising a silica- or magnesium fluoride-containing resin, a fluororesin as a lower-refractive index resin, or a silica- or magnesium fluoride-containing fluororesin and having a refractive index of not more than 1.46 and a thickness of about 30 nm to 1 μm, or a thin film formed by chemical deposition or physical deposition of silica or magnesium fluoride. Resins other than the fluororesin may be the same as used for constituting the antistatic layer.

More preferably, the lower-refractive index layer is formed of a silicone-containing vinylidene fluoride copolymer. Specifically, this silicone-containing vinylidene fluoride copolymer comprises a resin composition comprising 100 parts of a fluorocopolymer prepared by copolymerization using, as a starting material, a monomer composition containing 30 to 90% (all the percentages being by mass; the same shall apply hereinafter) of vinylidene fluoride and 5 to 50% of hexafluoropropylene, and having a fluorine content of 60 to 70% and 80 to 150 parts of an ethylenically unsaturated group-containing polymerizable compound. This resin composition is used to form a lower-refractive index layer having a refractive index of less than 1.60 (preferably not more than 1.46) which is a thin film having a thickness of not more than 200 nm and to which scratch resistance has been imparted.

For the silicone-containing vinylidene fluoride copolymer constituting the lower-refractive index layer, the content of individual components in the monomer composition is 30 to 90%, preferably 40 to 80%, particularly preferably 40 to 70%, for vinylidene fluoride, and 5 to 50%, preferably 10 to 50%, particularly preferably 15 to 45%, for hexafluoropropylene. This monomer composition may further comprise 0 to 40%, preferably 0 to 35%, particularly preferably 10 to 30%, of tetrafluoroethylene.

The above monomer composition may comprise other comonomer component in such an amount that is not detrimental to the purpose of use and effect of the silicone-containing vinylidene fluoride copolymer, for example, in an amount of not more than 20%, preferably not more than 10%. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and $\alpha$-trifluoromethacrylic acid.

The fluorocopolymer produced from this monomer composition should have a fluorine content of 60 to 70%, preferably 62 to 70%, particularly preferably 64 to 68%. When the fluorine content is in the above-defined specific range, the fluoropolymer has good solubility in solvents. The incorporation of the above fluoropolymer as a component can result in the formation of a thin film which has excellent adhesion to various base materials, has a high level of transparency and a low level of refractive index and, at the same time, has satisfactorily high mechanical strength. Therefore, the surface with the thin film formed thereon has a satisfactorily high level of mechanical properties such as scratch resistance which is very advantageous.

Preferably, the molecular weight of the fluorocopolymer is 5,000 to 200,000, particularly preferably 10,000 to 100,000, in terms of number average molecular weight as determined using polystyrene as a standard. When the fluorocopolymer having this molecular weight is used, the fluororesin composition has suitable viscosity and thus reliably has suitable coatability. The refractive index of the fluorocopolymer per se is preferably not more than 1.45, particularly preferably not more than 1.42, still more preferably not more than 1.40. When a fluorocopolymer having a refractive index exceeding 1.45 is used, in some cases, the thin film formed from the resultant fluorocoating composition has a low level of antireflection effect.

The lower-refractive index layer may also be formed of a thin film of $SiO_2$. This lower-refractive index layer may be formed, for example, by vapor deposition, sputtering, or plasma CVD, or by a method in which an $SiO_2$ gel film is formed from a sol liquid containing an $SiO_2$ sol. In addition to $SiO_2$, a thin film of $MgF_2$ or other material may constitute the lower-refractive index layer. However, the use of a thin film of $SiO_2$ is preferred from the viewpoint of high adhesion to the lower layer. Among the above methods, when plasma CVD is adopted, a method is preferably adopted in which an organosiloxane is used as a starting gas and the CVD is carried out in such a state that other inorganic vapor deposition sources are not present. Further, preferably, in the CVD, the substrate is kept at the lowest possible temperature.

Preferred Lower-refractive Index Layer

The lower-refractive index layer according to the present invention is preferably formed by preparing a composition for a lower-refractive index layer and coating the composition. The composition for a lower-refractive index layer may comprise fine particles, a resin, and optional components. The lower-refractive index layer may comprise a single layer or a plurality of layers.

Fine Particles

The fine particles may be formed of an inorganic material or an organic material, and examples thereof include fine particles of metals, metal oxides, and plastics. Preferred are silicon oxide (silica) fine particles. The silica fine particles can impart a desired refractive index while suppressing an increase in refractive index of the binder. The silica fine particles may be in any form such as crystalline, sol, or gel form. Further, the silica fine particles may be a commercially available product, and preferred examples thereof include AEROSIL (fumed silica)(tradename: manufactured by Degussa) and Colloidal silica (manufactured by Nissan Chemical Industries Ltd.).

In a preferred embodiment of the present invention, "void-containing fine particles" are utilized. The "void-containing fine particles" can lower the refractive index while maintaining the strength of the lower-refractive index layer. In the present invention, the expression "void-containing fine particles" refers to fine particles that have a structure containing gas filled into fine particles and/or a gas-containing porous structure and have a refractive index which is lowered inversely proportionally to the proportion of gas in the fine particles as compared with the refractive index of the fine particles per se. Further, in the present invention, the fine particles include those which can form a nanoporous structure in at least a part of the inside and/or surface of the fine particle depending upon the form, structure, aggregation state, and dispersion state of the fine particles within the coating film.

Specific examples of preferred void-containing inorganic fine particles include silica fine particles prepared by a technique disclosed in Japanese Patent Laid-Open No. 233611/2001. The void-containing silica fine particles can easily be produced, and the hardness of the void-containing silica fine particles per se is high. Therefore, when a lower-refractive index layer is formed of a mixture of the void-containing silica fine particles with a binder, the layer strength can be improved and the refractive index can be regulated to fall within a range of about 1.20 to 1.45. In particular, specific examples of preferred void-containing organic fine particles include empty polymer fine particles prepared by a technique disclosed in Japanese Patent Laid-Open No. 80503/2002.

Fine particles which can form a nanoporous structure in at least a part of the inside and/or surface of the coating film include, in addition to the above silica fine particles, sustained release materials which have been produced for increasing the specific surface area and adsorb various chemical substances in a packing column and a porous part provided on the surface thereof, porous fine particles for catalyst fixation purposes, or dispersions or aggregates of empty fine particles to be incorporated in insulating materials or low-permittivity materials. Specific examples thereof include those in a preferred particle diameter range of the present invention selected from commercially available products, for example, aggregates of porous silica fine particles selected from NIPSIL or NIPGEL (tradenames, manufactured by Nippon Silica Industrial Co., Ltd.), Colloidal silica UP series, (tradename:

manufactured by Nissan Chemical Industries Ltd.) having a structure in which silica fine particles are connected to one another in a chain form.

The average particle diameter of the fine particles is not less than 5 nm and not more than 300 nm. Preferably, the lower limit is 8 nm, and the upper limit is 100 nm. More preferably, the lower limit is 10 nm, and the upper limit is 80 nm. When the average particle diameter of the fine particles is in the above-defined range, excellent transparency can be imparted to the lower-refractive index layer.

Hydrophobitization of Fine Particles

In a preferred embodiment of the present invention, hydrophobitized fine particles are preferred. Fine particles to be hydrophobitized per se may be hydrophobic or nonhydrophobic, or may have both hydrophobic and nonhydrophobic properties. The hydrophobitization may be carried out on the whole surface of the fine particles, alternatively may be carried out until the hydrophobitization reaches the internal structure. Methods for hydrophobitization of the fine particles include 1) a hydrophobitization method using a low molecular weight organic compound, 2) a hydrophobitization method in which the surface is coated with a polymeric compound, 3) a hydrophobitization method using a coupling agent, and 4) a hydrophobitilzation method in which a hydrophobic polymer is grafted.

Resin

The resin comprises a monomer containing three or more, per molecule, ionizing radiation curable functional groups. The monomer used in the present invention contains an ionizing radiation curable functional group (hereinafter often referred to as "ionizing radiation curable group") and contains a heat curable functional group (hereinafter often referred to as "heat curable group"). Accordingly, easy formation of a chemical bond such as a crosslinking bond within a coating film and efficient curing of the coating film can be realized by coating a composition containing this monomer (a coating liquid) onto a surface of an object, drying the coating, and applying an ionizing radiation or conducting application of an ionizing radiation in combination with heating.

The "ionizing radiation curable group" having this monomer is a functional group which, upon exposure to an ionizing radiation, can allow a reaction for bringing the molecular weight to a large one to proceed for curing the coating film, such as polymerization or crosslinking, for example, a functional group of which the reaction proceeds by such reaction forms as polymerization reactions such as photoradical polymerization, photocation polymerization, or photoanion polymerization, or addition polymerization or condensation polymerization which proceeds through photodimerization. Among them, ethylenically unsaturated bonding groups such as acryl, vinyl, and allyl groups causes a photoradical polymerization reaction either directly upon exposure to an ionizing radiation such as ultraviolet light or electron beams or indirectly through the action of an initiator and, thus, are preferred because of their relatively easy handling, for example, in the photocuring process.

The "heat curable group" which may be contained in the monomer component is a functional group that, upon heating, can cause the progress of a reaction for bringing the molecular weight to a large one, such as polymerization or crosslinking between identical functional groups or between this functional group and other functional group and thus can cause curing. Specific examples of such groups include an alkoxy group, a hydroxyl group, a carboxyl group, an amino group, an epoxy group, and a hydrogen bond forming group. Among these functional groups, the hydrogen bond forming group is preferred because, when the fine particles are inorganic ultrafine particles, it is also excellent in affinity for hydroxyl group present on the surface of the fine particles and can advantageously improve the dispersiblity of the inorganic ultrafine particles and their aggregate in the binder. Among hydrogen bond forming groups, a hydroxyl group is particularly preferred, because the hydroxyl group can easily be introduced into the binder component to improve the storage stability of the coating composition and, upon heat curing, can form a covalent bond with a hydroxyl group present on the surface of inorganic fine particles having voids resulting in the action of the fine particles having voids as a crosslinking agent to further improve the coating film strength. In order to sufficiently lower the refractive index of the coating film, the refractive index of the monomer component is preferably not more than 1.65.

An example of the binder for the coating composition used in the formation of the lower-refractive index layer in the antireflective laminate according to the present invention is a monomer component containing two or more, per molecule, ionizing radiation curable groups, which can improve the crosslinking density of the coating film and can improve the film strength or hardness and thus is preferred.

In order to lower the refractive index of the coating film and to impart water repellency, the presence of a fluorine atom in the molecule is preferred. In the present invention, the use of a combination of a fluorine atom-containing polymer, which has a number average molecular weight of not less than 20000 and is curable upon exposure to an ionizing radiation, with a fluorine-containing and/or fluorine-free monomer containing two or more, per molecule, functional groups curable upon exposure to an ionizing radiation, is prepared. The composition comprising this combination comprises an ionizing radiation curing-type fluorine atom-containing monomer and/or polymer as a binder for imparting a film forming property (a film forming capability) and a low refractive index to the lower-refractive index composition.

The monomer and/or oligomer containing and/or free from a fluorine atom in its molecule have the effect of enhancing the crosslinking density of the coating film and, by virtue of the low molecular weight, are a highly fluid component which can advantageously improve the coatability of the coating composition. Since the fluorine atom-containing polymer has a satisfactorily large molecular weight, the polymer has better film forming properties than the fluorine atom-containing and/or fluorine atom-free monomer and/or oligomer. A combination of this fluorine atom-containing polymer with the fluorine atom-containing and/or fluorine atom-free monomer and/or oligomer can improve the fluidity, can improve suitability as a coating liquid, and further can improve the crosslinking density and, thus, can improve the hardness or strength of the coating film.

Specific examples of fluorine atom-containing monomers include fluoroolefins (for example, fluoroethylene, vinylidene fluoride, tetrafluoroethylene, hexafluoropropylene, perfluorobutadiene, and perfluoro-2,2-dimethyl-1,3-dioxole), partially or fully fluorinated alkyl, alkenyl, and aryl esters of acrylic or methacrylic acids, fully or partially fluorinated vinyl ethers, fully or partially fluorinated vinyl esters, and fully or partially fluorinated vinyl ketones.

Specific examples of fluorine atom-free monomers include diacrylate such as pentaerythritol triacrylate, ethylene glycol diacrylate, and pentaerythritol diacrylate monostearate; tri (meth)acrylate such as trimethylolpropane triacrylate, and pentaerythritol triacrylate; pentaerythritol tetracrylate derivatives, polyfunctional (meth)acrylate such as dipentaerythritol pentacrylate; or oligomers produced by polymerization of these radically polymerizable monomers. These fluorine-free monomers and/or oligomers may be used in a combination of two or more.

Optional Components

The lower-refractive index layer comprises hydrophobitized fine particles and a binder and may further optionally comprises, for example, a fluorocompound and/or a silicon compound, and a binder other than the ionizing radiation curing-type resin composition containing a fluorine atom in its molecule. Further, the coating liquid for lower-refractive index layer formation may contain a solvent, a polymerization initiator, a curing agent, a crosslinking agent, an ultraviolet shielding agent, an ultraviolet absorber, a surface conditioning agent (a leveling agent), and other components.

Other Layer

The optical laminate according to the present invention comprises a light transparent base material and a hardcoat layer (and optionally a lower refractive index layer). If necessary, an antistatic layer is preferably provided between these layers or on the outermost surface of the optical laminate.

Antistatic Layer

The antistatic layer is formed using a liquid composition for an antistatic layer comprising an antistatic agent, a solvent, and a resin. The antistatic agent and the solvent may be the same as those described above in connection with the hardcoat layer. The thickness of the antistatic layer is preferably approximately not less than 10 nm and not more than 1 μm. In this layer thickness range, the weight ratio of the addition amount of the antistatic agent to the resin in the antistatic layer, that is, PV ratio (PV ratio=weight of antistatic agent/weight of resin) is not less than 100 and not more than 500, preferably not less than 300 and not more than 500. Still more preferably, the upper limit of the PV ratio is 350. When the addition weight ratio is in the above-defined range, good antistatic properties can be imparted to the antistatic layer. For example, the surface resistivity value of the antistatic layer can be brought to not more than $10^7 \Omega/\square$. This can be effectively realized particularly when the PV ratio is not less than 300.

Resin

Specific examples of resins usable herein include thermoplastic resins, heat curing resins, or ionizing radiation curing resins or ionizing radiation curing compounds (including organic reactive silicon compounds). Thermoplastic resins may be used as the resin. More preferably, heat curing resins are used. Still more preferred are ionizing radiation curing resins or ionizing radiation curing compound-containing ionizing radiation curing compositions.

The ionizing radiation curing composition is a composition prepared by properly mixing a prepolymer, oligomer and/or monomer containing a polymerizable unsaturated bond or epoxy group in its molecule together. The ionizing radiation refers to a radiation having an energy quantum which can polymerize or crosslink the molecule among electromagnetic waves or charged particle beams and is generally ultraviolet light or electron beams.

Examples of prepolymers and oligomers in the ionizing radiation curing composition include unsaturated polyesters such as condensates of unsaturated dicarboxylic acids and polyhydric alcohols, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cation polymerizable epoxy compounds.

Examples of monomers in the ionizing radiation curing composition include styrene monomers such as styrene and α-methyl styrene, acrylic esters such as methyl acrylate, 2-ethylhexyl acrylate, methoxyethyl acrylate, butoxyethyl acrylate, butyl acrylate, methoxybutyl acrylate, and phenylacrylate, methacrylic esters such as methyl methacrylate, ethyl methacrylate, propyl methacrylate, methoxyethyl methacrylate, ethoxymethyl methacrylate, phenyl methacrylate, and lauryl methacrylate, unsaturated substituted amino alcohol esters such as 2-(N,N-diethylamino)ethyl acrylate, 2-(N,N-dimethylamino)ethyl acrylate, 2-(N,N-dibenzylamino) methyl acrylate, and 2-(N,N-diethylamino)propyl acrylate, unsaturated carboxylic acid amides such as acrylamide and methacrylamide, compounds such as ethylene glycol diacrylate, propylene glycol diacrylate, neopentyl glycol diacrylate, 1,6-hexanediol diacrylate, and triethylene glycol diacrylate, polyfunctional compounds such as dipropylene glycol diacrylate, ethylene glycol diacrylate, propylene glycol dimethacrylate, and diethylene glycol dimethacrylate, and/or polythiol compounds containing two or more thiol groups in the molecule thereof, for example, trimethylolpropane trithioglycolate, trimethylolpropane trithiopropylate, and pentaerythritol tetrathioglycolate.

In general, if necessary, one or a mixture of at least two of the compounds described above is used as the monomer in the ionizing radiation curing composition. In order to impart ordinary coatability to the ionizing radiation curing composition, preferably, the content of the prepolymer or oligomer is brought to not less than 5% by weight, and the content of the monomer and/or polythiol compound is brought to not more than 95% by weight.

When flexibility is required of a film formed by coating the ionizing radiation curing composition and curing the coating, this requirement can be met by reducing the amount of the monomer or using an acrylate monomer having one or two functional groups. When abrasion resistance, heat resistance, and solvent resistance are required of a film formed by coating the ionizing radiation curing composition and curing the coating, this requirement can be met by tailoring the design of the ionizing radiation curing composition, for example, by using an acrylate monomer having three or more functional groups. Monofunctional acrylate monomers include 2-hydroxy acrylate, 2-hexyl acrylate, and phenoxyethyl acrylate. Difunctional acrylate monomers include ethylene glycol diacrylate and 1,6-hexanediol diacrylate. Tri- or higher functional acrylate monomers include trimethylolpropane triacrylate, pentaerythritol triacrylate, pentaerythritol tetraacrylate, and dipentaerythritol hexaacrylate.

In order to regulate properties such as flexibility or surface hardness of a film formed by coating the ionizing radiation curing composition and curing the coating, a resin not curable by ionizing radiation irradiation may also be added to the ionizing radiation curing composition. Specific examples of resins usable herein include thermoplastic resins such as polyurethane resins, cellulosic resins, polyvinyl butyral resins, polyester resins, acrylic resins, polyvinylchloride resins, and polyvinyl acetate. Among them, polyurethane resins, cellulosic resins, polyvinyl butyral resins and the like are preferably added from the viewpoint of improving the flexibility.

When curing after coating of the ionizing radiation curing composition is carried out by ultraviolet light irradiation, photopolymerization initiators or photopolymerization accelerators are added. In the case of radically polymerizable unsaturated group-containing resins, photopolymerization initiators usable herein include acetophenones, benzophenones, thioxanthones, benzoins, and benzoin methyl ethers. They may be used either solely or as a mixture of two or more.

In the case of cationically polymerizable functional group-containing resins, photopolymerization initiators usable herein include aromatic diazonium salts, aromatic sulfonium salts, aromatic iodonium salts, metallocene compounds, benzoinsulfonic esters and the like. They may be used either solely or as a mixture of two or more. The amount of the photopolymerization initiator added is 0.1 to 10 parts by weight based on 100 parts by weight of the ionizing radiation curing composition.

The ionizing radiation curing composition may be used in combination with the following organic reactive silicon compound.

One of organic silicon compounds usable herein is represented by general formula $R_mSi(OR')_n$ wherein R and R' represent an alkyl group having 1 to 10 carbon atoms; and m as a subscript of R and n as a subscript of OR' each are an integer satisfying a relationship represented by m+n=4.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethyl methoxysilane, dimethylpropoxysilane, dimethylbutoxysilane, methyldimethoxysilane, methyldiethoxysilane, and hexyltrimethoxysilane.

Organic silicon compounds usable in combination with the ionizing radiation curing composition are silane coupling agents. Specific examples thereof include γ-(2-aminoethyl) aminopropyltrimethoxysilane, γ-(2-aminoethyl) aminopropylmethyldimethoxysilane, β-(3,4-epoxycyclohexyl) ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyl-tris(β-methoxyethoxy)silane, octadecyldimethyl [3-(trimethoxysilyl)propyl] ammonium chloride, methyltrichlorosilane, and dimethyldichlorosilane.

Formation of antistatic layer

A coating film as the antistatic layer may be formed by coating a composition comprising a mixture of an antistatic agent, a resin, and a solvent by a coating method such as roll coating, Mayer bar coating, or gravure coating. After coating of this liquid composition, the coating is dried, and the dried coating is cured by ultraviolet light. The ionizing radiation curing resin composition is cured by exposure to an electron beam or ultraviolet light. In the case of electron beam curing, for example, electron beams having an energy of 100 to 300 KeV are used. On the other hand, in the case of curing by ultraviolet light, for example, ultraviolet light generated from light sources such as ultrahigh pressure mercury lamps, high pressure mercury lamps, low pressure mercury lamps, carbon arc lamps, xenon arc lamps, and metal halide lamps is used.

3) Second Optical Laminate According to the Present Invention

The second optical laminate according to the present invention has the same construction as the first optical laminate according to the present invention, except that, instead of the antistatic agent-containing hardcoat layer in the first optical laminate according to the present invention, an antistatic layer and a hardcoat layer (or a hardcoat layer and an antistatic layer) were provided in that order on the light transparent base material. Accordingly, the hardcoat layer in the second embodiment of the present invention may be the same as the hardcoat layer described above in connection with the optical laminate in the first embodiment of the present invention, except that any antistatic agent is not contained. Further, the antistatic layer according to the present invention may be the same as that described above in connection with the first optical laminate according to the present invention except for the following point.

Antistatic Layer

The antistatic layer is formed using a liquid composition for an antistatic layer, comprising an antistatic agent, a solvent, and a resin. The antistatic agent and the solvent may be the same as those described above in connection with the hardcoat layer. The thickness of the antistatic layer is preferably approximately not less than 10 nm and not more than 1 μm. In this layer thickness range, the weight ratio of the addition amount of the antistatic agent to the resin in the antistatic layer, that is, PV ratio (PV ratio=weight of antistatic agent/weight of resin) is not less than 100 and not more than 500, preferably not less than 300 and not more than 500. Still more preferably, the upper limit of the PV ratio is 350. When the addition weight ratio is in the above-defined range, good antistatic properties can be imparted to the antistatic layer. For example, the surface resistivity value of the antistatic layer can be brought to not more than $10^7\Omega/\square$. This can be effectively realized particularly when the PV ratio is not less than 300.

2. Production Process of Optical Laminate

Preparation of Composition for Each Layer

Each composition for the hardcoat layer, the lower-refractive index layer and the like may be prepared according to a conventional preparation method by mixing the above-described components together and subjecting the mixture to dispersion treatment. The mixing and dispersion can be properly carried out, for example, by a paint shaker or a beads mill.

Coating

Specific examples of methods for coating each composition include various methods such as spin coating, dip coating, spray coating, slide die coating, bar coating, roll coating, meniscus coating, flexographic printing, screen printing, and bead coating.

The curing resin composition may be cured by electron beam or ultraviolet light irradiation. In the case of electron beam curing, for example, electron beams having an energy of 100 KeV to 300 KeV is used. In the case of ultraviolet curing, for example, ultraviolet light emitted from ultrahigh pressure mercury lamps, high pressure mercury lamps, low pressure mercury lamps, carbon arcs, xenon arcs, metal halide lamps or the like may be used.

3. Use of Optical Laminate

The optical laminate according to the present invention is utilized as hardcoat laminates, preferably as antireflective laminates. The optical laminate according to the present invention is utilized in transmission display devices. In particular, the optical laminate according to the present invention is used for display in televisions, computers, word processors and the like, especially on display surfaces, for example, in CRTs, PDPs, or liquid crystal panels.

Polarizing Plate

A polarizing plate is composed mainly of a polarizing film and two protective laminates holding the polarizing film from respective both sides thereof. Preferably, the antireflection laminate according to the present invention is used in at least one of the two protective laminates holding the polarizing film from both sides thereof. When the optical laminate according to the present invention functions also as the protective laminate, the production cost of the polarizing plate can be reduced. The use of the optical laminate according to the present invention as the outermost layer can provide a polarizing plate that can prevent external light reflection and the like and, at the same time, is also excellent in scratch resistance, anti-fouling properties and the like. The polarizing film may be a conventional polarizing film or a polarizing film taken off from a continuous polarizing film of which the absorption axis of the polarizing film is neither parallel nor perpendicular to the longitudinal axis.

4. Evaluation Apparatus for Optical Laminate (Evaluation Method)

According to another aspect of the present invention, there is provided an apparatus (method) for evaluating an optical laminate.

One embodiment of the apparatus for evaluating an optical laminate according to the present invention will be described in conjunction with FIG. 1. An apparatus 1 for evaluating the optical laminate basically comprises a light source 3, an image display device 5, and a second optical measuring instrument 7. For the optical laminate, at the outset, the total light transmittance and the five-degree reflectance are previously measured with the first optical measuring instrument. Next, in FIG. 1, a light source 3 is installed at a position distant from a light irradiation position of the optical laminate 4 attached to the image display device 5 by about 1400 mm above in the vertical direction and by about 700 mm in the parallel direction. The second optical measuring instrument (luminance meter) 7 is installed at a position distant from the light irradiation position of the optical laminate 4 attached to the image display device 5 by about 500 mm in the parallel direction. The optical laminate 4 is evaluated in such a state that the optical laminate 4 is attached to the image output surface in the image display device 5. Light is applied from the light source 3 so that the illuminance was 700 luxes toward the optical laminate 4 and was 250 luxes to the surface of the optical laminate as viewed from the front face of the second optical measuring instrument 7. The optical measuring instrument 7 measures the black luminance of the optical laminate 4. Thereafter, the numeral values determined with the first optical measuring instrument and the second optical measuring instrument 7 are sent to the detector to detect and evaluate for confirming that the black luminance and the total light transmittance are not more than 9.3 $cd/m^2$ and not less than 80% and not more than 94%, respectively, and the five-degree reflectance is not more than 4.5%. In a preferred embodiment of the present invention, the detector is provided with a computing unit set in such a manner that the black luminance, the total light transmittance, and the five-degree reflectance are set to respective ranges specified in the present invention and the optical laminate is evaluated based on whether or not the measured values fall within these ranges. More preferably, a computer is used for output and input of these data and analyzing these data.

EXAMPLES

The present invention will be described in more detail with reference to the following Examples. However, it should be noted that the contents of the present invention should not be construed as limited to the contents of the following Examples.

1. Preparation of Composition for Each Layer Formation

Compositions for each layer formation were prepared by mixing the following ingredients according to the following formulations. Abbreviations for use in the following formulations are as follows.

Abbreviations

PV ratio: Addition ratio between resin component and antistatic agent in each layer after coating film formation. The PV ratio represents the weight ratio of the addition amount of the antistatic agent to the resin component in the composition for antistatic agent-containing hardcoat layer formation and the composition for antistatic layer formation. Specifically, PV ratio=weight of antistatic agent/weight of resin component.

ATO: antimony doped tin oxide ultrafine particles (antistatic agent)

ITO: indium tin oxide ultrafine particles (antistatic agent)

Composition 1 for antistatic agent-containing hardcoat layer (PV ratio 5)

| | |
|---|---|
| ATO: "SN-100P" (tradename: manufactured by ISHIHARA TECHNO CORPORATION) | 5 parts by weight |
| Dispersion liquid: SOLSEPERSE 3000 (acid functional polymeric dispersing agent) (tradename: manufactured by Avecia) | 2 parts by weight |
| Photocurable resin: PET 30 (polyethylene terephthalate) (tradename: manufactured by Nippon Kayaku Co., Ltd.) | 100 parts by weight |
| Photoinitiator: IRGACURE 184 (aryl ketone containing hydroxyclohexyl phenyl ketone) (tradename: manufactured by Ciba Specialty Chemicals, K.K.) | 4 parts by weight |
| Isopropyl alcohol | 100 parts by weight |

Composition 2 for antistatic agent-containing hardcoat layer (PV ratio 10)

| | |
|---|---|
| ATO: SN-100 P (tradename: manufactured by ISHIHARA TECHNO CORPORATION) | 10 parts by weight |
| Dispersion liquid: SOLSEPERSE 3000 (tradename: manufactured by Avecia) | 4 parts by weight |
| Photocurable resin: PET 30 (tradename: manufactured by Nippon Kayaku Co., Ltd.) | 100 parts by weight |
| Photoinitiator: IRGACURE 184 (tradename: manufactured by Ciba Specialty Chemicals, K.K.) | 4 parts by weight |
| Isopropyl alcohol | 100 parts by weight |

Composition 3 for antistatic agent-containing hardcoat layer (PV ratio 25)

| | |
|---|---|
| ATO: SN-100 P (tradename: manufactured by ISHIHARA TECHNO CORPORATION) | 25 parts by weight |
| Dispersion liquid: SOLSEPERSE 3000 (tradename: manufactured by Avecia) | 4 parts by weight |
| Photocurable resin: PET 30 (tradename: manufactured by Nippon Kayaku Co., Ltd.) | 100 parts by weight |
| Photoinitiator: IRGACURE 184 (tradename: manufactured by Ciba Specialty Chemicals, K.K.) | 4 parts by weight |
| Isopropyl alcohol | 100 parts by weight |

Composition for hardcoat layer

| | |
|---|---|
| Photocurable resin: PET 30 (tradename: manufactured by Nippon Kayaku Co., Ltd.) | 40 parts by weight |
| Photoinitiator: IRGACURE 184 | 4 parts by weight |
| Toluene | 60 parts by weight |

Composition for antistatic layer

| | |
|---|---|
| ASHD 300 S (tradename; manufactured by The Inctec Inc.) | 5 parts by weight |
| Photoinitiator: IRGACURE 184 | 0.2 part by weight |
| Cyclohexanone | 22 parts by weight |

Composition 1 for lower-refractive index layer

| | |
|---|---|
| Fluorine atom-containing binder resin (tradename: OPTOOL AR 100, manufactured by Daikin Industries, Ltd.) | 15 parts by weight |
| Photopolymerization initiator: IRGACURE 907 (tradename: manufactured by Ciba Specialty Chemicals, K.K.) | 0.3 part by weight |
| Methylisobutyl ketone | 85.3 parts by weight |

Composition 2 for lower-refractive index layer

| | |
|---|---|
| Fluorine atom-containing binder resin (tradename: OPTOOL AR 100, manufactured by Daikin Industries, Ltd.) | 13 parts by weight |
| Photocurable resin: PET 30 (tradename: manufactured by Nippon Kayaku Co., Ltd.) | 2 parts by weight |
| Photopolymerization initiator: IRGACURE 907 (tradename: manufactured by Ciba Specialty Chemicals, K.K.) | 0.3 part by weight |
| Methylisobutyl ketone | 85.3 parts by weight |

2. Preparation of optical laminate

Example 1

A polyethylene terephthalate (PET) film (manufactured by Toray Industries, Inc., #100-U46, thickness 100 μm) was provided. A composition 1 for an antistatic agent-containing hardcoat layer was bar coated onto a surface of this film. Thereafter, the solvent was removed by drying, and ultraviolet light was then applied to the coating with an ultraviolet irradiation apparatus (Fusion UV Systems Japan KK, light source H bulb) at an exposure of 108 mJ/$m^2$ to cure the coating and thus to form a 10 μm-thick ATO-containing hardcoat layer.

Next, a composition 2 for a lower-refractive index layer was bar coated onto the surface of the ATO-containing hardcoat layer. The coating was dried to remove the solvent from the coating, and ultraviolet light was then applied to the coating with an ultraviolet irradiation apparatus (Fusion UV Systems Japan KK, light source H bulb) at an exposure of 192 mJ/$m^2$ to cure the coating and thus to prepare an optical laminate. The layer thickness was regulated so that the minimum value of the reflectance was at a wavelength around 550 nm.

Example 2

An optical laminate was prepared in the same manner as in Example 1, except that the composition 1 for an antistatic agent-containing hardcoat layer was changed to the composition 2 for an antistatic agent-containing hardcoat layer, and the thickness of the antistatic agent-containing hardcoat layer was changed to 3 μm.

Example 3

An optical laminate was prepared in the same manner as in Example 1, except that the composition 1 for an antistatic agent-containing hardcoat layer was changed to the composition 3 for an antistatic agent-containing hardcoat layer, and the thickness of the antistatic agent-containing hardcoat layer was changed to 5 μm.

Example 4

A triacetate cellulose (TAC) film (TF80UL, manufactured by Fuji Photo Film Co., Ltd., thickness 80 μm) was provided. A composition for an antistatic layer was bar coated onto this film, and the coating was dried to remove the solvent from the coating. Ultraviolet light was then applied to the coating with an ultraviolet irradiation apparatus (Fusion UV Systems Japan KK, light source H bulb) at an exposure of 92 mJ/$m^2$ to cure the coating and thus to form a 10 nm-thick antistatic layer.

Next, a composition for a hardcoat layer was bar coated on the surface of the antistatic layer. The coating was dried to remove the solvent from the coating. Ultraviolet light was then applied to the coating with an ultraviolet irradiation apparatus (Fusion UV Systems Japan KK, light source H bulb) at an exposure of 108 mJ/$m^2$ to cure the coating and thus to form a 5 μm-thick hardcoat layer. Thus, a desired optical laminate was prepared.

Example 5

An optical laminate was prepared in the same manner as in Example 4, except that the thickness of the antistatic layer was changed to 200 nm. The composition 1 for a lower-refractive index layer was bar coated onto the surface of the hardcoat layer in the optical laminate, and the coating was dried to remove the solvent from the coating. Ultraviolet light was then applied to the coating with an ultraviolet irradiation apparatus (Fusion UV Systems Japan KK, light source H bulb) at an exposure of 192 mJ/$m^2$ to cure the coating and thus to prepare an optical laminate. The layer thickness was regulated so that the minimum value of the reflectance was at a wavelength around 550 nm.

Example 6

An optical laminate was prepared in the same manner as in Example 5, except that the thickness of the antistatic layer was 500 nm.

Comparative Example 1

A triacetate cellulose (TAC) film (thickness 80 μm) was provided. A composition 1 for a hardcoat layer was bar coated onto a surface of this film. Thereafter, the solvent was removed by drying, and ultraviolet light was then applied to the coating with an ultraviolet irradiation apparatus (Fusion UV Systems Japan KK, light source H bulb) at an exposure of 108 mJ/$m^2$ to cure the coating and thus to form a 5 μm-thick hardcoat layer.

Next, a composition 1 for a lower-refractive index layer was bar coated onto the surface of the hardcoat layer. The coating was dried to remove the solvent from the coating, and ultraviolet light was then applied to the coating with an ultraviolet irradiation apparatus (Fusion UV Systems Japan KK, light source H bulb) at an exposure of 192 $mJ/m^2$ to cure the coating and thus to prepare an optical laminate. The layer thickness was regulated so that the minimum value of the reflectance was at a wavelength around 550 nm.

Comparative Example 2

An optical laminate was prepared in the same manner as in Comparative Example 1, except that the triacetate cellulose (TAC) film (thickness 80 μm) was changed to a polyethylene terephthalate (PET) film (thickness 100 μm), and the composition 1 for a lower-refractive index layer was changed to the composition 2 for a lower-refractive index layer.

Comparative Example 3

An optical laminate was prepared in the same manner as in Example 3, except that the thickness of the antistatic agent-containing hardcoat layer was changed to 3 μm.

Evaluation Test

The optical laminates prepared in Examples 1 to 6 and Comparative Examples 1 and 2 were tested for the following items. The results are shown in Table 1 below.

Evaluation 1: Black luminance

An apparatus shown in FIG. 1 was provided. A surface film applied to an image output surface in an image display device (CPD-G200J: manufactured by Sony Corp.) was peeled off so that the glass face constituted the outermost surface (the black luminance in the case where black was displayed in this glass surface state was 9.13 $cd/m^2$). The optical laminate was attached to the glass surface. Black was displayed on the image output face, and the black luminance was measured with an optical measuring instrument (a luminance meter) at a position distant by 500 mm from the optical laminate.

Evaluation 2: Total light transmittance

The total light transmittance (%) was measured according to JIS K 7105 with a haze meter HR100 (tradename; manufactured by Murakami Color Research Laboratory).

Evaluation 3: Five-degree reflectance (Y value)

The five-degree reflectance (%) in the wavelength range of 400 to 700 nm was measured with a spectrometer (UV-3100PC: manufactured by Shimadzu Seisakusho Ltd.). The luminosity was corrected according to JIS Z 8701.

Evaluation 4: PV ratio

The weight ratio of the addition amount of the antistatic agent to the amount of the resin component in the antistatic agent-containing hardcoat layer or the antistatic layer was determined as PV ratio.

Evaluation 5: Layer thickness

The thickness of the antistatic layer or the antistatic agent-containing hardcoat layer was measured with SEM and TEM (both manufactured by Japan Electric Optical Laboratory (JEOL)).

TABLE 1

| | Evaluation 1 | Evaluation 2 | Evaluation 3 | Evaluation 4 | Evaluation 5 |
|---|---|---|---|---|---|
| Ex. 1 | 8.86 | 92.0 | 1.60 | 5 | 10 μm |
| Ex. 2 | 8.44 | 90.1 | 1.62 | 10 | 3 μm |
| Ex. 3 | 6.76 | 80.2 | 1.58 | 25 | 5 μm |
| Ex. 4 | 9.03 | 92.0 | 4.48 | 300 | 10 nm |
| Ex. 5 | 9.05 | 92.9 | 1.31 | 350 | 200 nm |
| Ex. 6 | 6.33 | 80.3 | 1.33 | 400 | 500 nm |
| Comp. Ex. 1 | 9.40 | 95.2 | 1.1 | — | — |
| Comp. Ex. 2 | 9.32 | 94.6 | 1.14 | — | — |
| Comp. Ex. 3 | 6.54 | 77.5 | 1.54 | 27 | 3 μm |

The invention claimed is:

1. An optical laminate comprising: a light transparent base material; and a hardcoat layer provided on said light transparent base material, wherein said hardcoat layer comprises a resin and an antistatic agent, said optical laminate has a black luminance of not more than 9.3 $cd/m^2$, and said optical laminate has a total light transmittance of not less than 80% and not more than 94%.

2. The optical laminate according to claim 1, which has a 5-degree reflectance of not more than 4.5%.

3. The optical laminate according to claim 1, wherein the thickness of the hardcoat layer is not less than 3 μm and not more than 10 μm.

4. The optical laminate according to claim 1, wherein a lower-refractive index layer having a refractive index of less than 1.60 is provided on the outermost surface of the hardcoat layer.

5. The optical laminate according to claim 1, which is used as an antireflective laminate.

6. The optical laminate according to claim 1, which is utilized in an image display device.

7. An optical laminate comprising: a light transparent base material, an antistatic layer, and a hardcoat layer provided in that order on said light transparent base material, wherein said hardcoat layer comprises a non-antistatic agent containing resin, said antistatic layer comprises a resin and an antistatic agent, said optical laminate has a black luminance of not more than 9.3 $cd/m^2$, and said optical laminate has a total light transmittance of not less than 80% and not more than 94%.

8. The optical laminate according to claim 7, which has a 5-degree reflectance of not more than 4.5%.

9. The optical laminate according to claim 7, wherein the thickness of the antistatic layer is not less than 10 nm and not more than 1 μm.

10. The optical laminate according to claim 7, wherein a lower-refractive index layer having a refractive index of less than 1.60 is provided on the outermost surface of the hardcoat layer.

* * * * *